US012654487B2

(12) United States Patent
Stueve

(10) Patent No.: US 12,654,487 B2
(45) Date of Patent: Jun. 16, 2026

(54) HUBCAP FOR A HUB OF A WHEEL ASSEMBLY

(71) Applicant: CNH Industrial America LLC, New Holland, PA (US)

(72) Inventor: Tanner Douglas Stueve, Fargo, ND (US)

(73) Assignee: CNH Industrial America LLC, New Holland, PA (US)

( * ) Notice: Subject to any disclaimer, the term of this patent is extended or adjusted under 35 U.S.C. 154(b) by 309 days.

(21) Appl. No.: 18/582,813

(22) Filed: Feb. 21, 2024

(65) Prior Publication Data

US 2025/0262888 A1 Aug. 21, 2025

(51) Int. Cl.
| | |
|---|---|
| *B60B 7/00* | (2006.01) |
| *B60B 19/08* | (2006.01) |
| *B62D 55/092* | (2006.01) |
| *B62D 55/14* | (2006.01) |

(52) U.S. Cl.
CPC ............ *B60B 7/0013* (2013.01); *B60B 19/08* (2013.01); *B62D 55/092* (2013.01); *B60B 2320/10* (2013.01); *B60B 2360/109* (2013.01); *B60B 2360/32* (2013.01); *B60B 2900/511* (2013.01); *B62D 55/14* (2013.01)

(58) Field of Classification Search
CPC ......... B60B 7/00; B60B 7/0013; B60B 7/002; B60B 19/08; B62D 55/14; B62D 55/15; B62D 55/092
See application file for complete search history.

(56) References Cited

U.S. PATENT DOCUMENTS

| | | | | |
|---|---|---|---|---|
| 3,114,579 | A | * 12/1963 | Isenbarger | ............ F16C 33/664 |
| | | | | 137/855 |
| 5,492,393 | A | * 2/1996 | Peisker | ................. F16C 33/723 |
| | | | | 301/108.4 |
| 5,505,525 | A | * 4/1996 | Denton | ................. F16C 33/726 |
| | | | | 301/108.4 |
| 11,173,742 | B2 | 11/2021 | Weyer et al. | |
| 11,491,817 | B2 | * 11/2022 | Templin | ................. B60B 7/002 |
| 2013/0320752 | A1 | * 12/2013 | Kile | ....................... F16J 15/062 |
| | | | | 305/100 |
| 2014/0116808 | A1 | * 5/2014 | Kile | ..................... B62D 55/092 |
| | | | | 184/108 |
| 2019/0367108 | A1 | * 12/2019 | Weyer | ................... B60B 7/0013 |
| 2021/0101406 | A1 | * 4/2021 | Reshad | ................ B60B 7/0013 |

FOREIGN PATENT DOCUMENTS

CN 214083699 U * 8/2021

* cited by examiner

*Primary Examiner* — Kip T Kotter
(74) *Attorney, Agent, or Firm* — Fletcher Yoder, P.C.

(57) ABSTRACT

A hubcap for a hub of a wheel assembly includes a body configured to couple to the hub. The body is formed from a first material having a first hardness, and the body has a port extending along a path through the body from a port inlet to a port outlet. The hubcap also includes an insert disposed within the port. The insert includes internal threads configured to engage corresponding external threads of a plug, the insert is formed from a second material having a second hardness, and the second hardness is greater than the first hardness. Furthermore, the port includes a seal-engaging surface configured to engage a seal of the plug, and each interface between the first material and the second material along a plug-facing interior surface of the path is positioned downstream from the seal-engaging surface.

20 Claims, 5 Drawing Sheets

HUBCAP FOR A HUB OF A WHEEL ASSEMBLY

BACKGROUND

The present disclosure relates generally to a hubcap for a hub of a wheel assembly.

Certain work vehicles (e.g., tractors) have track assemblies configured to facilitate movement of the work vehicle along the ground. Each track assembly may include a track and a drive wheel configured to drive the track to rotate. In addition, each track assembly may include idler wheels and roller wheels, which are driven to rotate by the track. The idler wheels and the roller wheels are configured to distribute the weight of the work vehicle over a larger area of the ground, thereby reducing the pressure applied by the work vehicle to the ground.

Each of the idler wheels and the roller wheels may be part of a respective wheel assembly having a hub and a hubcap. The wheel may be coupled to the hub, and the hub may be configured to rotate about an axle. In addition, bearing(s) may be radially positioned between the axle and the hub, thereby enabling the hub, and the wheel coupled to the hub, to rotate. The bearing(s) may be lubricated by oil disposed within the hub, and the hubcap may be configured to retain the oil within the hub. The hubcap may include a port configured to receive the oil, and a plug may be configured to selectively engage the port, thereby blocking oil flow out of the port. The plug may include external threads, and the hubcap may include internal threads. The plug may be coupled to the hubcap by engaging the external threads of the plug with the internal threads of the hubcap and rotating the plug.

BRIEF DESCRIPTION

In certain embodiments, a hubcap for a hub of a wheel assembly includes a body configured to couple to the hub. The body is formed from a first material having a first hardness, and the body has a port extending along a path through the body from a port inlet to a port outlet. The hubcap also includes an insert disposed within the port. The insert includes internal threads configured to engage corresponding external threads of a plug, the insert is formed from a second material having a second hardness, and the second hardness is greater than the first hardness. Furthermore, the port includes a seal-engaging surface configured to engage a seal of the plug, and each interface between the first material and the second material along a plug-facing interior surface of the path is positioned downstream from the seal-engaging surface.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

Figure 1:
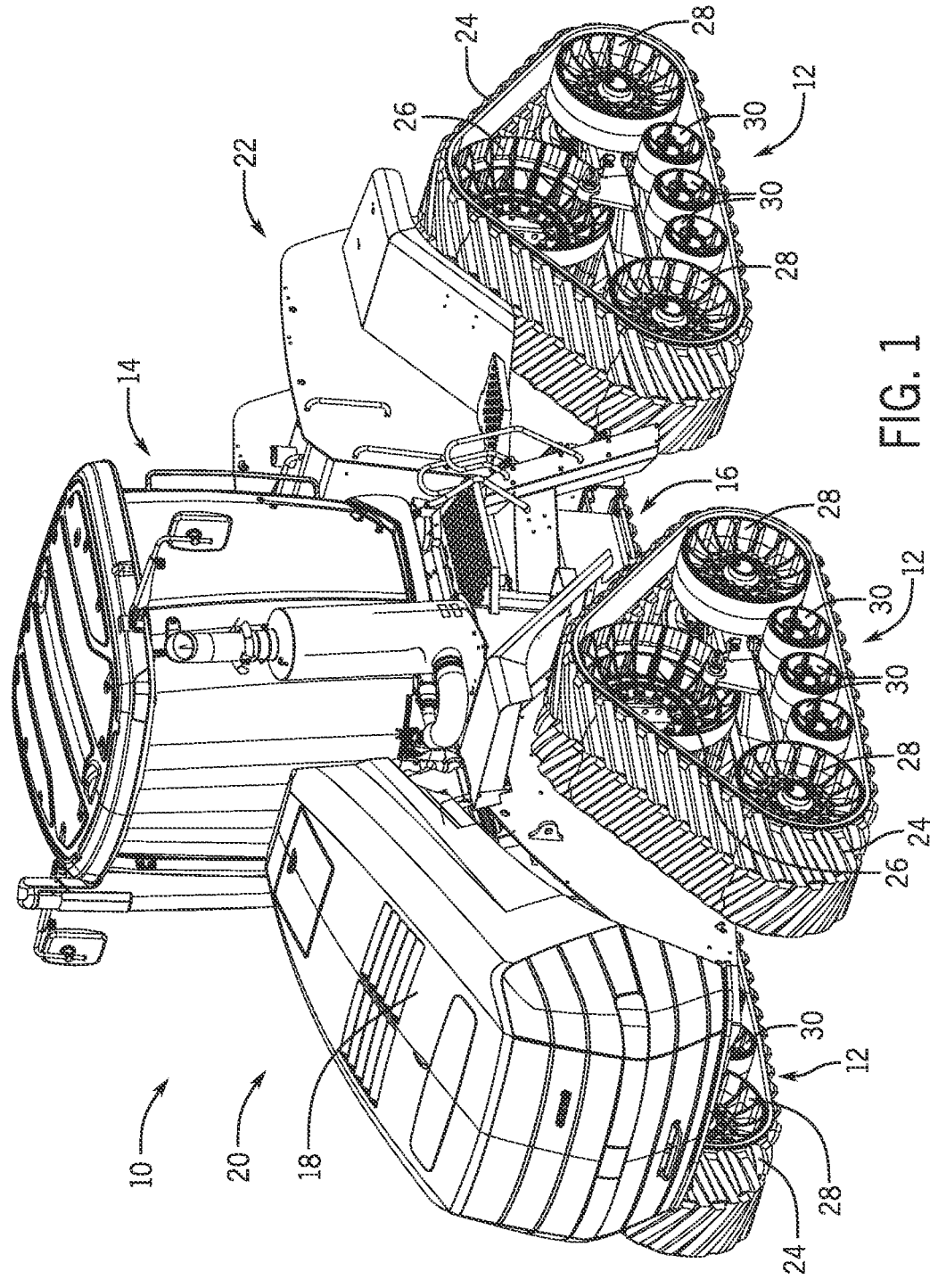
FIG. 1 is a perspective view of an embodiment of a work vehicle having multiple track assemblies.

FIG. 1 is a perspective view of an embodiment of a work vehicle 10 having multiple track assemblies 12. In the illustrated embodiment, the work vehicle 10 includes a cab 14 and a chassis 16. The cab 14 is configured to house an operator (e.g., in a sitting or standing position), and multiple controls (e.g., hand control(s), touchscreen control(s), etc.) may be positioned within the cab 14 to enable the operator to control the work vehicle 10. The chassis 16 is configured to support various components of the work vehicle, such as an engine, a transmission, a hydraulic system, an electrical system, other suitable component(s), or a combination thereof. In addition, the work vehicle 10 includes a hood 18 configured to house at least a portion of the components. The hood 18 may be rotatably coupled to the chassis 16 to selectively facilitate access to certain components.

In the illustrated embodiment, the chassis 16 is configured to articulate to control a direction of movement of the work vehicle 10. As illustrated, the chassis 16 includes a front portion 20 and a rear portion 22, which are pivotally coupled to one another. Actuators may drive the front and rear portions to pivot relative to one another to steer the work vehicle 10, thereby controlling the direction of movement of the work vehicle 10. While the chassis 16 is configured to articulate in the illustrated embodiment, in other embodiments, the chassis may be rigid (e.g., non-articulating). In such embodiments, the direction of movement of the work vehicle may be controlled by steering the front track assemblies and/or the rear track assemblies. In the illustrated embodiment, the work vehicle 10 includes four track assemblies 12. However, in other embodiments, the work vehicle may include two track assemblies 12 and two wheel assemblies (e.g., on the front portion or on the rear portion).

In the illustrated embodiment, each track assembly 12 includes a track 24 configured to engage the ground. The track 24 includes treads configured to increase traction of the track assembly 12 with the ground. In addition, each track assembly 12 includes a drive wheel 26 configured to drive the track 24 to rotate. Each drive wheel 26 may be driven to rotate by the engine (e.g., via a transmission) or by a motor (e.g., hydraulic motor or electric motor). In addition, each drive wheel 26 may include protrusions disposed about the circumference of the drive wheel and configured to engage corresponding recesses in the track 24. Engagement between the protrusions of the drive wheel and the recesses of the track may enable the drive wheel to drive the track to rotate. Furthermore, each track assembly 12 includes idler wheels 28 and roller wheels 30. The idler wheels 28 and the roller wheels 30 are driven to rotate by the track 24, and the idler wheels 28 and the roller wheels 30 are configured to distribute the weight of the work vehicle 10 over a large area, thereby reducing the pressure applied by the work vehicle to the ground. In the illustrated embodiment, each wheel assembly 12 includes four idler wheels 28 and six roller wheels 30. However, in other embodiments, at least one wheel assembly may include more or fewer idler wheels and/or more or fewer roller wheels.

Each idler wheel 28 is part of an idler wheel assembly, and each roller wheel 30 is part of a roller wheel assembly. Each wheel assembly (e.g., idler wheel assembly or roller wheel assembly) includes the wheel (e.g., idler wheel or roller wheel), a hub coupled to the wheel, and a hubcap coupled to the hub. The hub is disposed about an axle, and one or more bearings are radially positioned between the axle and the hub, thereby facilitating rotation of the wheel assembly. The hub is filled with oil to lubricate the bearing(s), and the hubcap retains the oil within the hub. In addition, the wheel assembly includes a plug configured to selectively engage the hubcap. For example, the plug may be removed from the hubcap to enable an operator to add oil to the wheel assembly, and the plug may be engaged with the hubcap to block the flow of oil from the hub.

As discussed in detail below, at least one wheel assembly includes a hubcap having a body configured to couple to the hub. The body is formed from a first material (e.g., a polymeric material, etc.) having a first hardness, and the body has a port extending along a path through the body from a port inlet to a port outlet. In addition, the hubcap includes an insert disposed within the port. The insert includes internal threads configured to engage corresponding external threads of the plug. The insert is formed from a second material (e.g., brass, etc.) having a second hardness, and the second hardness is greater than the first hardness. Because the insert is formed from a harder material than the body, the longevity of the internal threads may be increased (e.g., as compared to a hubcap without the insert, in which the internal threads are formed in the body). Furthermore, the port includes a seal-engaging surface configured to engage a seal (e.g., o-ring, etc.) of the plug. Each interface between the first material and the second material along a plug-facing interior surface of the path is positioned downstream from the seal-engaging surface. Because each interface is positioned downstream from the seal-engaging surface, the possibility of oil leaking through an interface to an exterior of the wheel assembly is substantially reduced or eliminated.

In the illustrated embodiment, the work vehicle 10 is a tractor, and the hubcap disclosed herein may be employed within any of the wheel assemblies of the tractor (e.g., each wheel assembly of the tractor). Furthermore, the hubcap disclosed herein may be employed within a wheel assembly of any other suitable work vehicle or implement having at least one track assembly. For example, the work vehicle/ implement may be a skid steer, an agricultural implement, a bulldozer, or another suitable work vehicle/implement.

Figure 2:
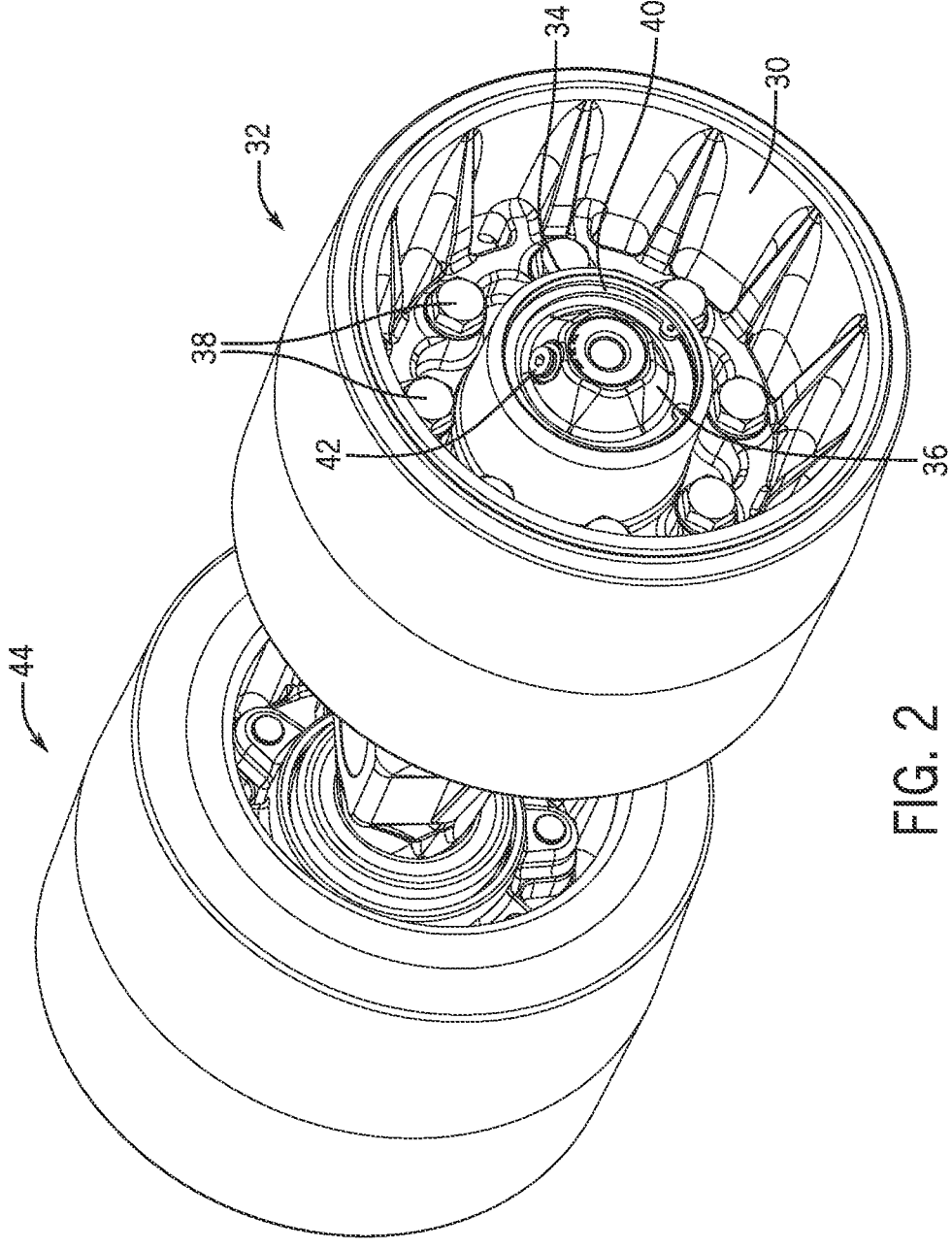
FIG. 2 is a perspective view of an embodiment of a roller wheel assembly that may be employed within a track assembly of FIG. 1.

FIG. 2 is a perspective view of an embodiment of a roller wheel assembly 32 that may be employed within a track assembly of FIG. 1. As previously discussed, the roller wheel assembly 32 includes the roller wheel 30, a hub 34, and a hubcap 36. In the illustrated embodiment, the roller wheel 30 is coupled to the hub 34 by multiple fasteners 38, thereby facilitating removal and replacement of the roller wheel 30 (e.g., due to wear). While the roller wheel 30 is coupled to the hub 34 by fasteners 38 in the illustrated embodiment, in other embodiments, the roller wheel may be coupled to the hub by other suitable type(s) of connection(s) (e.g., alone or in combination with the fasteners), such as latch(es), a welded connection, other suitable type(s) of connection(s), or a combination thereof. Furthermore, in certain embodiments, the roller wheel may be integrally formed with the hub. In the illustrated embodiment, the hubcap 36 is coupled to the hub 34 via a retaining ring 40. While the hubcap 36 is coupled to the hub 34 via the retaining ring 40 in the illustrated embodiment, in other embodiments, the hubcap may be coupled to the hub via other suitable type(s) of connection(s) (e.g., alone or in combination with the retaining ring), such as fastener(s), an adhesive connection, other suitable type(s) of connection(s), or a combination thereof.

As previously discussed, the hub 34 is disposed about an axle, and one or more bearings are radially positioned between the axle and the hub 34. The bearing(s) are configured to enable the hub 34, and the roller wheel 30 that is coupled to the hub 34, to rotate about the axle. Accordingly, the roller wheel 30 may be driven to rotate by the track. Furthermore, an interior of the hub 34 (e.g., the space between the hub 34 and the axle) is filled with oil, thereby lubricating the bearing(s). The hubcap 36 is configured to retain the oil within the interior of the hub. For example, a seal (e.g., o-ring, etc.) may be axially positioned between the hubcap and the hub, and the retaining ring may drive the hubcap to compress the seal, thereby blocking oil flow from the interface between the hub and the hubcap. In addition, the roller wheel assembly 32 includes a plug 42 configured to selectively engage the hubcap 36. For example, the plug 42 may be removed from the hubcap 36 to enable an operator to add oil to the roller wheel assembly 32, and the plug 42 may be engaged with the hubcap 36 to block the flow of oil from the hub 34.

In the illustrated embodiment, a second roller wheel assembly 44 is rotatably coupled to the axle. Accordingly, the axle supports two roller wheel assemblies. The structure and configuration of the second roller wheel assembly 44 may be the same as the roller wheel assembly disclosed above. While two roller wheel assemblies are rotatably coupled to the axle in the illustrated embodiment, in other embodiments, a single wheel assembly may be coupled to the axle. For example, each roller wheel assembly may be supported by a respective axle.

Figure 3:
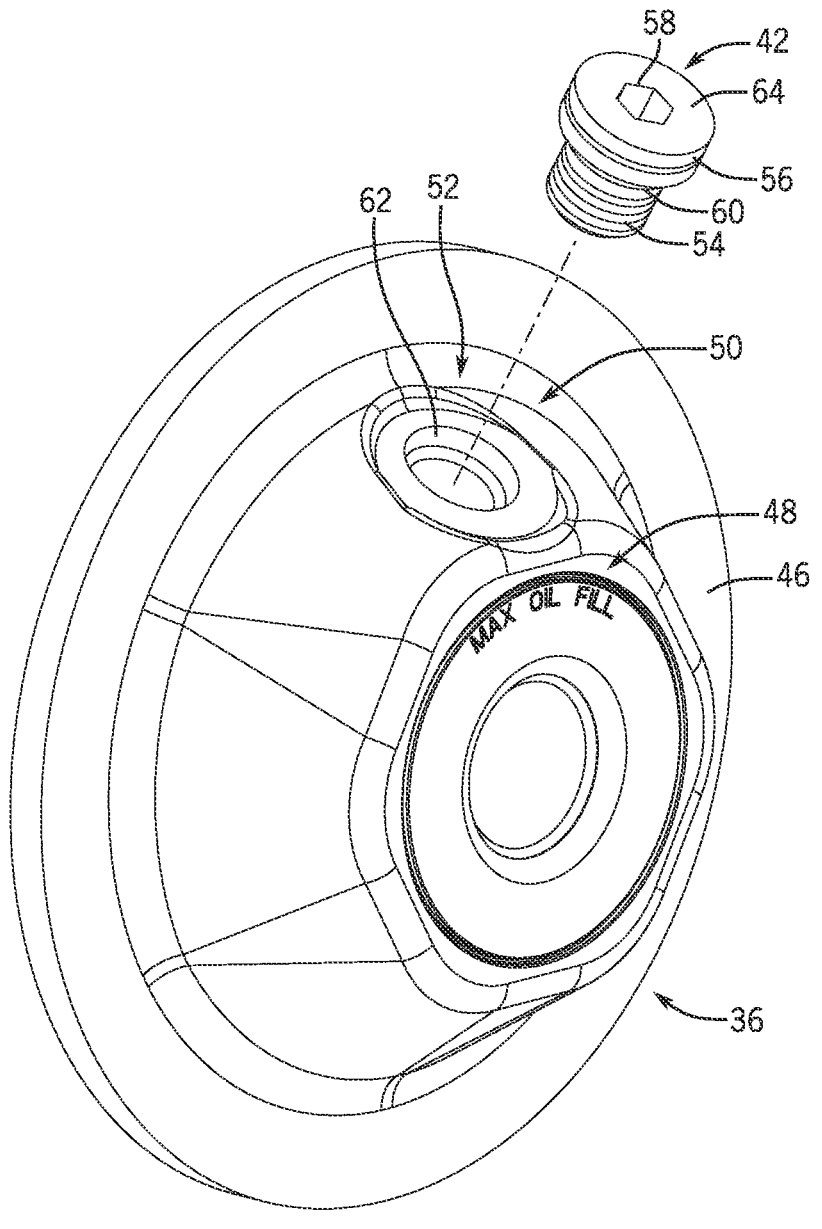
FIG. 3 is an exploded view of an embodiment of a hubcap and a plug that may be employed within the roller wheel assembly of FIG. 2.

FIG. 3 is an exploded view of an embodiment of a hubcap 36 and a plug 42 that may be employed within the roller wheel assembly of FIG. 2. In the illustrated embodiment, the hubcap 36 includes a body 46, which is configured to couple to the hub of the roller wheel assembly. The body is formed from a first material having a first hardness. In certain embodiments, the first material includes a polymeric material, such as polycarbonate (PC), acrylic, polyethylene terephthalate (PET), polyvinyl chloride (PVC), polyethylene (PE), etc. Furthermore, in certain embodiments, the first material is transparent, thereby enabling the operator to view a level of oil within the hub. In the illustrated embodiment, the body has a "MAX OIL FILL" indicator 48, which indicates a maximum recommended level of oil within the hub. However, in other embodiments, the "MAX OIL FILL" indicator may be omitted. In addition, while a transparent first material is disclosed above, in certain embodiments, the first material may be translucent or opaque. Furthermore, while a first material including a polymeric material is disclosed above, in certain embodiments, the first material may include a composite material, a metallic material, or another suitable material. In the illustrated embodiment, the first material forms an entirety of the body 46. However, in other embodiments, the first material may form a portion of the body (e.g., the portion forming the port 50 of the body 46).

The port 50 of the body 46 extends along a path through the body 46 from a port inlet 52 to a port outlet. In addition, as discussed in detail below, the hubcap 36 includes an insert disposed within the port 50. The insert includes internal threads configured to engage corresponding external threads 54 of the plug 42. As illustrated, the plug 42 has a body 56, and the external threads 54 are formed on the body 56. The external threads 54 of the plug 42 are configured to engage the internal threads of the insert to couple the plug 42 to the hubcap 36. In addition, as discussed in detail below, the insert is formed from a second material having a second hardness, and the second hardness is greater than the first hardness. Accordingly, the longevity of the internal threads may be increased (e.g., as compared to a hubcap without the insert, in which the internal threads are formed in the body).

In the illustrated embodiment, a recess 58 is formed within the body 56 of the plug 42. The recess 58 is configured to receive a tool to facilitate rotation of the plug 42 relative to the hubcap 36. In the illustrated embodiment, the recess 58 has a hexagonal shape. However, in other embodiments, the recess may have another suitable shape (e.g., octagonal, elliptical, etc.). Furthermore, in certain embodiments, the recess may be omitted. In such embodiments, a head of the plug may have a shape (e.g., polygonal, elliptical, etc.) suitable for engaging a recess of a tool, such that the tool non-rotatably couples to the head, thereby enabling the tool to drive the plug to rotate.

In the illustrated embodiment, the plug 42 includes a seal 60 (e.g., o-ring, etc.) disposed about the body 56 of the plug 42. In addition, the port 50 includes a seal-engaging surface 62 configured to engage the seal 60 of the plug 42. While the external threads 54 of the plug 42 are engaged with the internal threads of the insert, rotation of the plug 42 in a first rotational direction may drive the head 64 of the plug 42 to compress the seal 60 against the seal-engaging surface 62 of the port 50, thereby blocking oil flow through the interface between the plug 42 and the hubcap 36. As a result, the oil may be retained within the hub during operation of the work vehicle. In addition, the plug 42 may be removed from the hubcap 36 via rotation of the plug 42 in a second rotational direction, opposite the first rotational direction, thereby enabling additional oil to be added to the hub. The seal 60 may be formed from any suitable material, such as a polymeric material or natural rubber.

Figure 4:
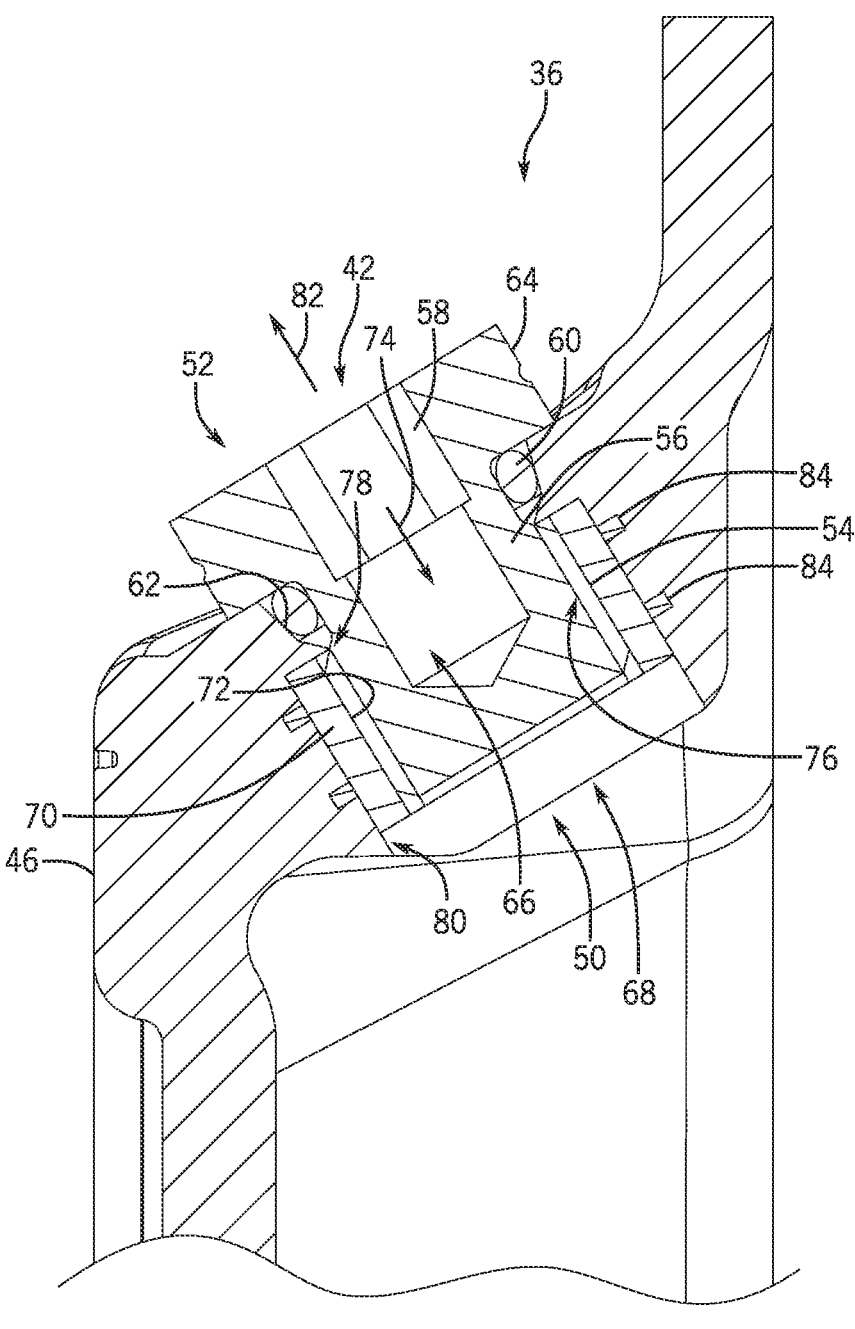
FIG. 4 is a cross-sectional view of the hubcap and the plug of FIG. 3.

FIG. 4 is a cross-sectional view of the hubcap 36 and the plug 42 of FIG. 3. As illustrated, the port 50 of the body 46 of the hubcap 36 extends along a path 66 through the body 46 from the port inlet 52 to a port outlet 68. When the plug 42 is disengaged from the hubcap 36, the port 50 enables an operator to add oil to the hub. In addition, the hubcap 36 includes an insert 70 disposed within the port 50. As previously discussed, the insert 70 has internal threads 72 configured to engage the corresponding external threads 54 of the plug 42. Accordingly, the plug 42 may be coupled to the hubcap 36 via engagement of the external threads 54 of the plug 42 with the internal threads 72 of the insert 70 and rotation of the plug 42 (e.g., via a tool engaged with the recess 58).

As previously discussed, the body 46 of the hubcap 36 is formed from a first material having a first hardness, and the insert 70 is formed from a second material having a second hardness. The second hardness is greater than the first hardness. Accordingly, the longevity of the internal threads 72 of the insert 70 may be increased (e.g., as compared to a hubcap without the insert, in which the internal threads are formed in the body). In certain embodiments, the second material includes a metallic material, such as brass, steel, stainless steel, etc. However, in other embodiments, the second material may include another suitable material, such as a ceramic material, a composite material, or another suitable material. In the illustrated embodiment, the second material forms an entirety of the insert 70. However, in other embodiments, the second material may form a portion of the insert (e.g., the portion forming the internal threads).

As previously discussed, the seal-engaging surface 62 of the port 50 is configured to engage the seal 60 of the plug 42. While the external threads 54 of the plug 42 are engaged with the internal threads 72 of the insert 70, rotation of the plug 42 in a first rotational direction may drive the head 64 of the plug 42 to compress the seal 60 against the seal-engaging surface 62 of the port 50, thereby blocking oil flow through the interface between the plug 42 and the hubcap 36. As a result, the oil may be retained within the hub during operation of the work vehicle. In addition, the plug 42 may be removed from the hubcap 36 via rotation of the plug 42 in a second rotational direction, opposite the first rotational direction, thereby enabling additional oil to be added to the hub. In the illustrated embodiment, the seal-engaging surface 62 tapers inwardly along a downstream direction 74. As used herein, the "downstream direction" refers to a direction along the path 66 through the port 50 from the port inlet 52 to the port outlet 68. The taper of the seal-engaging surface 62 may facilitate disposition of the plug 42 within the port 50 and engagement of the seal 60 with the seal-engaging surface 62. While the seal-engaging surface 62 tapers inwardly along the downstream direction 74 in the illustrated embodiment, in other embodiments, the seal-engaging surface may have another suitable configuration (e.g., a ledge, a groove, etc.).

Each interface between the body 46/the first material of the body 46 and the insert 70/the second material of the insert 70 along a plug-facing interior surface 76 of the path 66 (e.g., including a plug-facing interior surface of the body/the first material of the body at the port and a plug-facing interior surface of the insert/the second material of the insert) is positioned downstream (e.g., along the downstream direction 74) from the seal-engaging surface 62 of the port 50. Accordingly, the possibility of oil leaking through an interface to an exterior of the wheel assembly is substantially reduced or eliminated. In the illustrated embodiment, an entirety of the insert 70 is positioned downstream from the seal-engaging surface 62. Accordingly, a first interface 78 between the body 46/the first material of the body 46 and the insert 70/the second material of the insert 70 along the plug-facing interior surface 76 of the path 66 is positioned downstream (e.g., along the downstream direction 74) from the seal-engaging surface 62 of the port 50. In addition, a second interface 80 between the body 46/the first material of the body 46 and the insert 70/the second material of the insert 70 along the plug-facing interior surface 76 of the path 66 is positioned downstream (e.g., along the downstream direction 74) from the seal-engaging surface 62 of the port 50. As a result, any oil that leaks from the first interface 78 or the second interface 80 flows into the port 50 and is blocked from leaking to the exterior of the roller wheel assembly by the seal 60 (e.g., the interface between the seal 60 and the seal-engaging surface 62 and the interface between the seal 60 and the plug 42). For example, during operation of the work vehicle, oil may flow from the interior of the hub, into the second interface 80, around the insert 70 (e.g., between the insert 70 and the body 46 of the hubcap 36), and out of the first interface 78. Oil flowing out of the first interface 78 is blocked from leaking to the exterior of the wheel assembly by the seal 60.

In certain embodiments, the hubcap 36 may be manufactured by forming the body 46 from the first material, forming the insert 70 from the second material, and disposing the insert 70 within the port 50 of the body 46. For example, a size (e.g., inner diameter) of the port outlet 68 may be sufficient to enable the insert 70 to be inserted into the port 50 along an upstream direction 82. The insert 70 may be coupled to the body 46 via an ultrasonic welding process, via an adhesive, via another suitable connection, or a combination thereof. While insertion of the insert 70 into the port 50 through the port outlet 68 is disclosed above, in certain embodiments, the insert may be inserted into the port through the port inlet. Furthermore, while manufacturing the hubcap by disposing the insert into the port of the body is disclosed above, in certain embodiments, the hubcap may be manufactured by molding the body around the insert. For example, in certain embodiments, the insert may be disposed within a mold cavity, and the body of the hubcap may be formed within the mold cavity (e.g., via an injection molding process, etc.).

In the illustrated embodiment, the insert 70 includes multiple outer protrusions 84 engaged with the first material of the body 46 of the hubcap 36. The outer protrusions 84 are configured to enhance the connection between the insert 70 and the body 46. In certain embodiments, each outer protrusion 84 may include an angled face configured to facilitate insertion of the insert 70 into the port 50 (e.g., along the upstream direction 82) and to block removal of the insert 70 from the port 50 (e.g., along the downstream direction 74). However, in other embodiments, at least one outer protrusion may have another suitable shape. Furthermore, in the illustrated embodiment, the insert 70 includes two outer protrusions 84. However, in other embodiments, the insert may include more or fewer protrusions (e.g., 1, 3, 4, or more). Furthermore, in certain embodiments, the protrusions may be omitted.

Figure 5:
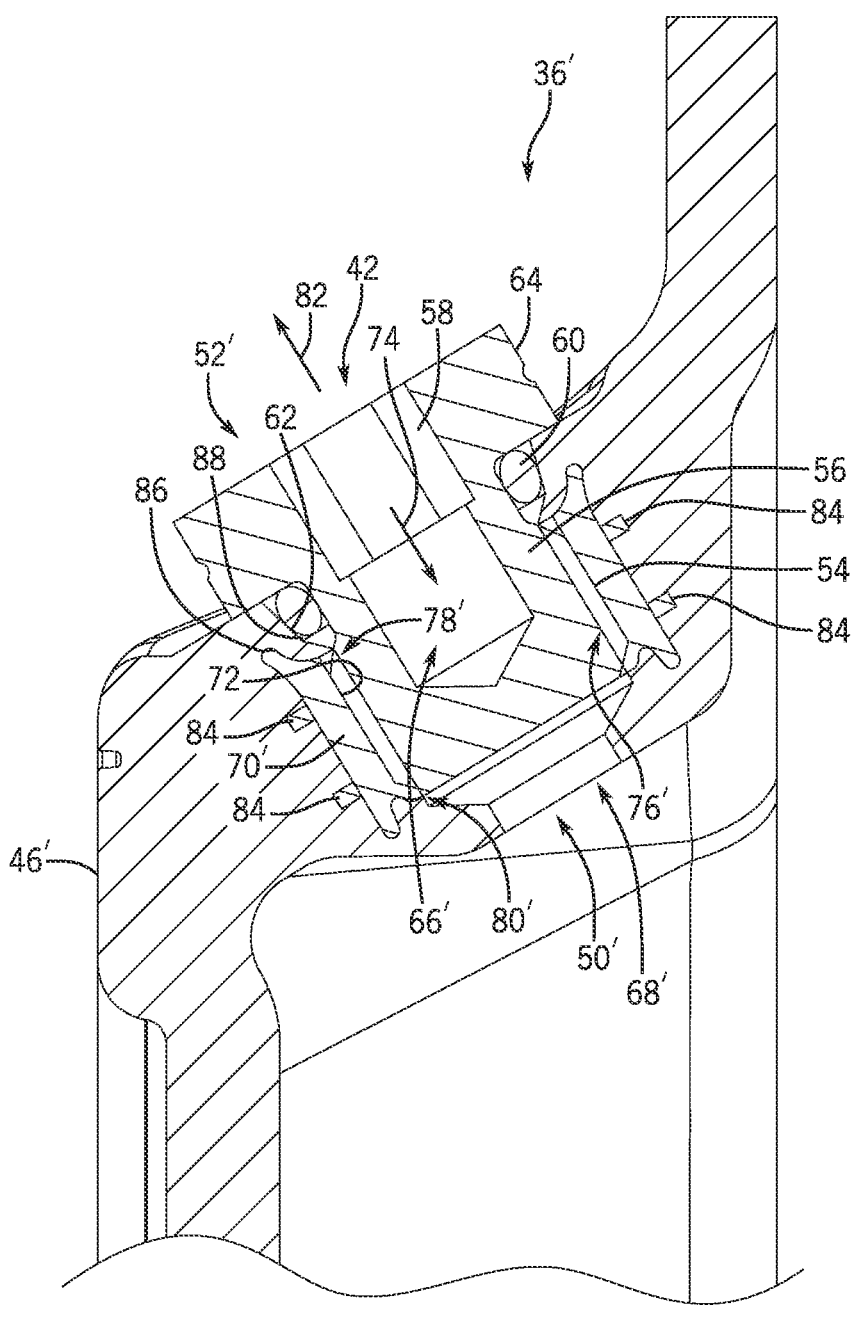
FIG. 5 is a cross-sectional view of an embodiment of a hubcap and a plug that may be employed within the roller assembly of FIG. 2.

FIG. 5 is a cross-sectional view of an embodiment of a hubcap 36' and the plug 42 that may be employed within the roller assembly of FIG. 2. In the illustrated embodiment, a portion 86 of the insert 70' is disposed within the first material of the body 46' upstream (e.g., along the upstream direction 82) of a downstream end 88 of the seal-engaging surface 62. Disposition of the portion 86 of the insert 70' within the first material of the body 46' may enhance the connection between the insert 70' and the body 46'. While the insert 70' includes the portion 86 disposed within the first material of the body 46' upstream of the downstream end 88 of the seal-engaging surface 62 in the illustrated embodiment, in other embodiments, an entirety of the insert may be positioned downstream from the seal-engaging surface (e.g., as disclosed above with regard to FIG. 4).

Each interface between the body 46'/the first material of the body 46' and the insert 70'/the second material of the insert 70' along the plug-facing interior surface 76' of the path 66' (e.g., including a plug-facing interior surface of the body/the first material of the body at the port and a plug-facing interior surface of the insert/the second material of the insert) is positioned downstream (e.g., along the downstream direction 74) from the seal-engaging surface 62 (e.g., the downstream end 88 of the seal-engaging surface 62). Accordingly, the possibility of oil leaking through an interface to an exterior of the wheel assembly is substantially reduced or eliminated. The first interface 78' between the body 46'/the first material of the body 46' and the insert 70'/the second material of the insert 70' along the plug-facing interior surface 76' of the path 66' is positioned downstream (e.g., along the downstream direction 74) from the seal-engaging surface 62 (e.g., the downstream end 88 of the seal-engaging surface 62). In addition, the second interface 80' between the body 46'/the first material of the body 46' and the insert 70'/the second material of the insert 70' along the plug-facing interior surface 76' of the path 66' is positioned downstream (e.g., along the downstream direction 74) from the seal-engaging surface 62 (e.g., the downstream end 88 of the seal-engaging surface 62). As a result, any oil that leaks from the first interface 78' or the second interface 80' flows into the port 50 and is blocked from leaking to the exterior of the roller wheel assembly by the seal 60 (e.g., the interface between the seal 60 and the seal-engaging surface 62 and the interface between the seal 60 and the plug 42). For example, during operation of the work vehicle, oil may flow from the interior of the hub, into the second interface 80', around the insert 70' (e.g., between the insert 70' and the body 46' of the hubcap 36), and out of the first interface 78'. Oil flowing out of the first interface 78' is blocked from leaking to the exterior of the wheel assembly by the seal 60.

In certain embodiments, the hubcap 36' may be manufactured by molding the body 46' around the insert 70'. For example, in certain embodiments, the insert 70' may be disposed within a mold cavity, and the body 46' of the hubcap 36' may be formed within the mold cavity from the first material (e.g., via an injection molding process). In such embodiments, forming the body 46' includes forming the port 50' around the insert 70', in which the port 50' extends along the path 66' through the body 46' from the port inlet 52' to the port outlet 68'. Because the body 46' is molded around the insert 70', a size (e.g., inner diameter) of the port outlet 68' may be significantly less than the size (e.g., outer diameter) of the insert 70'. While molding the body 46' around the insert 70' is disclosed above, in certain embodiments, the insert may be disposed within the port after the body is formed, as disclosed above with reference to FIG. 4.

While certain variations between the illustrated insert 70' and the insert disclosed above with reference to FIG. 4, and certain variations between the illustrated body 46' and the body disclosed with reference to FIG. 4, are disclosed above, the other features of the illustrated hubcap 36' may be the same as the corresponding features of the hubcap disclosed above with reference to FIG. 4. Furthermore, any of the variations to the hubcap disclosed above with reference to FIG. 4 may apply to the illustrated hubcap. In addition, while the hubcap and the plug are disclosed herein with reference to one roller wheel assembly, the hubcap and the plug of any of the embodiments disclosed above may be employed within another roller wheel assembly (e.g., each roller wheel assembly of the work vehicle) and/or within at least one idler wheel assembly (e.g., each idler wheel assembly of the work vehicle).

While only certain features have been illustrated and described herein, many modifications and changes will occur to those skilled in the art. It is, therefore, to be understood that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112 (f). However, for any claims containing elements designated in any other manner, it is intended that such elements are not to be interpreted under 35 U.S.C. 112 (f).

The invention claimed is:

1. A hubcap for a hub of a wheel assembly, comprising:
a body configured to couple to the hub, wherein the body is formed from a first material having a first hardness, and the body has a port extending along a path through the body from a port inlet to a port outlet; and
an insert disposed within the port, wherein the insert comprises internal threads configured to engage corresponding external threads of a plug, the insert is formed from a second material having a second hardness, and the second hardness is greater than the first hardness;
wherein the port comprises a seal-engaging surface configured to engage a seal of the plug, and each interface between the first material and the second material along a plug-facing interior surface of the path is positioned downstream from the seal-engaging surface.

2. The hubcap of claim 1, wherein the first material is transparent.

3. The hubcap of claim 1, wherein the first material comprises a polymeric material.

4. The hubcap of claim 1, wherein the second material comprises brass.

5. The hubcap of claim 1, wherein the seal-engaging surface tapers inwardly along a downstream direction.

6. The hubcap of claim 1, wherein an entirety of the insert is positioned downstream from the seal-engaging surface.

7. The hubcap of claim 1, wherein a portion of the insert is disposed within the first material of the body upstream of a downstream end of the seal-engaging surface.

8. The hubcap of claim 1, wherein the insert comprises a plurality of outer protrusions engaged with the first material of the body.

9. A method of manufacturing a hubcap for a hub of a wheel assembly, comprising:
disposing an insert within a port of a body of the hubcap, wherein the body is configured to couple to the hub, the body is formed from a first material having a first hardness, the port extends along a path through the body from a port inlet to a port outlet, the insert comprises internal threads configured to engage corresponding external threads of a plug, the insert is formed from a second material having a second hardness, the second hardness is greater than the first hardness, and the port comprises a seal-engaging surface configured to engage a seal of the plug;
wherein disposing the insert within the port comprises positioning the insert such that each interface between the first material and the second material along a plug-facing interior surface of the path is positioned downstream from the seal-engaging surface.

10. The method of claim 9, comprising forming the body from the first material.

11. The method of claim 9, comprising forming the insert from the second material.

12. The method of claim 9, wherein disposing the insert within the port comprises engaging a plurality of outer protrusions of the insert with the first material of the body.

13. The method of claim 9, wherein the first material is transparent.

14. The method of claim 9, wherein the first material comprises a polymeric material, the second material comprises brass, or a combination thereof.

15. A method of manufacturing a hubcap for a hub of a wheel assembly, comprising:
disposing an insert within a mold cavity, wherein the insert comprises internal threads configured to engage corresponding external threads of a plug;
forming a body of the hubcap within the mold cavity from a first material, wherein the first material has a first hardness, the insert is formed from a second material having a second hardness, the second hardness is greater than the first hardness, and the body is configured to couple to the hub;
wherein forming the body comprises forming a port around the insert, the port extends along a path through the body from a port inlet to a port outlet, the port comprises a seal-engaging surface configured to engage a seal of the plug, and each interface between the first material and the second material along a plug-facing interior surface of the path is positioned downstream from the seal-engaging surface.

16. The method of claim 15, wherein the first material is transparent.

17. The method of claim 15, wherein the second material comprises brass.

18. The method of claim 15, wherein the insert comprises a plurality of outer protrusions, and the plurality of outer protrusions engages the first material during formation of the body.

19. The method of claim 15, wherein an entirety of the insert is positioned downstream from the seal-engaging surface.

20. The method of claim 15, wherein a portion of the insert is disposed within the first material of the body upstream of a downstream end of the seal-engaging surface.

* * * * *